US010460343B2

(12) United States Patent
Tseng (10) Patent No.: US 10,460,343 B2
(45) Date of Patent: Oct. 29, 2019

(54) ESTIMATING RADIUS OF A TARGET AREA FOR SERVING AN ADVERTISEMENT

(71) Applicant: Facebook, Inc., Menlo Park, CA (US)

(72) Inventor: Erick Tseng, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 691 days.

(21) Appl. No.: 14/526,365

(22) Filed: Oct. 28, 2014

(65) Prior Publication Data

US 2016/0117724 A1   Apr. 28, 2016

(51) Int. Cl.
*G06Q 30/00* (2012.01)
*G06Q 30/02* (2012.01)

(52) U.S. Cl.
CPC ............... *G06Q 30/0251* (2013.01)

(58) Field of Classification Search
None
See application file for complete search history.

(56) References Cited

U.S. PATENT DOCUMENTS

| | | | | |
|---|---|---|---|---|
| 2007/0271136 A1* | 11/2007 | Strauss | ............... | G06Q 30/02 705/14.61 |
| 2012/0259705 A1* | 10/2012 | Monteverde | ....... | G06Q 30/0251 705/14.58 |
| 2014/0095302 A1* | 4/2014 | Monteverde | ....... | G06Q 30/0251 705/14.47 |
| 2014/0164118 A1* | 6/2014 | Polachi | ............. | G06Q 30/0261 705/14.57 |
| 2014/0172573 A1* | 6/2014 | Saurabh | ............. | G06Q 30/0261 705/14.58 |
| 2015/0120455 A1* | 4/2015 | McDevitt | ........... | G06Q 30/0261 705/14.58 |
| 2015/0264523 A1* | 9/2015 | Xu | ........................ | H04W 4/021 455/456.3 |
| 2017/0324805 A1* | 11/2017 | Charaniya | ............... | H04L 67/10 |

* cited by examiner

*Primary Examiner* — Meredith A Long
(74) *Attorney, Agent, or Firm* — Fenwick & West LLP (57) ABSTRACT

An online system provides a local reach advertisement create flow that determines an estimated radius of a target area for serving an ad to optimize local awareness of the ad based on the advertiser's ad campaign goals. The ad create flow receives location information about an ad target location identified by or associated with the advertiser, and information describing the ad campaign associated with the advertiser. Using the advertising information and population density information associated with the ad target location, the online system selects a target area for serving the ad to reach an estimated number of online system users based on the ad budget and provides an indication of the selected region and the estimated ad reach to the advertiser.

17 Claims, 4 Drawing Sheets

ESTIMATING RADIUS OF A TARGET AREA FOR SERVING AN ADVERTISEMENT

BACKGROUND

This disclosure relates generally to a user interface included in an online system for publishing an advertisement to users within a geographic region.

An advertiser creates advertisement ("ad") campaigns that specify goals including a number of target people to be reached by the advertiser, referred to as ad reach. For example, an ad reach goal may specify for a given ad budget that the ad should reach a specified number of people. To achieve the ad reach goal, advertisers specify targeting criteria and specify a target area for serving the ad. But when serving the same ad in different target areas, advertisers may need to adjust how to specify a target area to achieve a constant ad reach goal for each target area. Restructuring ad campaign parameters to optimize ad reach for a particular location can be time consuming and require access to data not readily available to many advertisers.

SUMMARY

An online system provides a local reach advertisement create flow that determines an estimated radius of a target area for serving an ad to optimize local awareness of the ad based on the advertiser's ad campaign goals. The local reach ad create flow receives location information, such as street address, store number, or other information identifying an ad target location for publishing an ad, such as a merchant location associated with the advertiser. The online system also receives additional information describing the ad campaign, such as ad campaign goals, targeting criteria, ad run time, and ad budget. Using the advertising information, the online system selects a target area for serving the ad to reach an estimated number of online system users based on the ad budget. The online system may also provide an indication of the selected region and the estimated ad reach to the advertiser.

In one embodiment, the online system provides an ad create flow user interface that pre-fills or pre-populates a radius selection defining a target area for serving the ad based on location information for one or more ad target locations identified by or associated with an advertising user of the online system. In one embodiment, the online system selects a target area by performing a reverse look-up to determine geographic coordinates of the ad target location using ad target location information, and determines a measure of population density associated with the geographic coordinates of the ad target location. Using the population density and the ad campaign goals, the online system determines an estimated number of online system users that would be reached by the ad for a particular target area. In one embodiment, the ad create flow uses a user interface to display the estimated ad reach, along with selections for adjusting one or more of the target area, targeting criteria, ad spend amount, ad run time, and ad reach. For example, in response to receiving a selection indicating an adjusted radius of the target area, the online system determines an adjusted ad reach, while holding other parameters, including ad spend, targeting criteria, ad frequency, and ad duration, constant. More generally, in response to receiving an indication of an adjustment of an ad parameter selection, the online system may generate an adjusted value for one or more other ad parameter selections included in the local reach ad create flow user interface.

In one embodiment, the online system generates an estimated target radius by analyzing historical information describing radius selection information and ad campaign performance information. In one implementation, the online system includes one or more processors configured to execute an algorithm that receives historical radius selection information for ads previously published to online system users using the local reach ad create flow and actual ad performance information. Using this information, the online system dynamically generates an estimated radius. In one embodiment, the online system compares historical estimated ad reach information for a particular population density with actual ad reach. The online system increases the stored estimated reach information for that particular population density if the actual ad reach under delivers and decreases the stored estimated reach information if the actual ad reach over delivers. Thus, the disclosed local reach ad create flow provides a simple interface for quickly setting up an ad for publishing to online system users located nearby to an ad target location.

DETAILED DESCRIPTION

System Architecture

Figure 1:
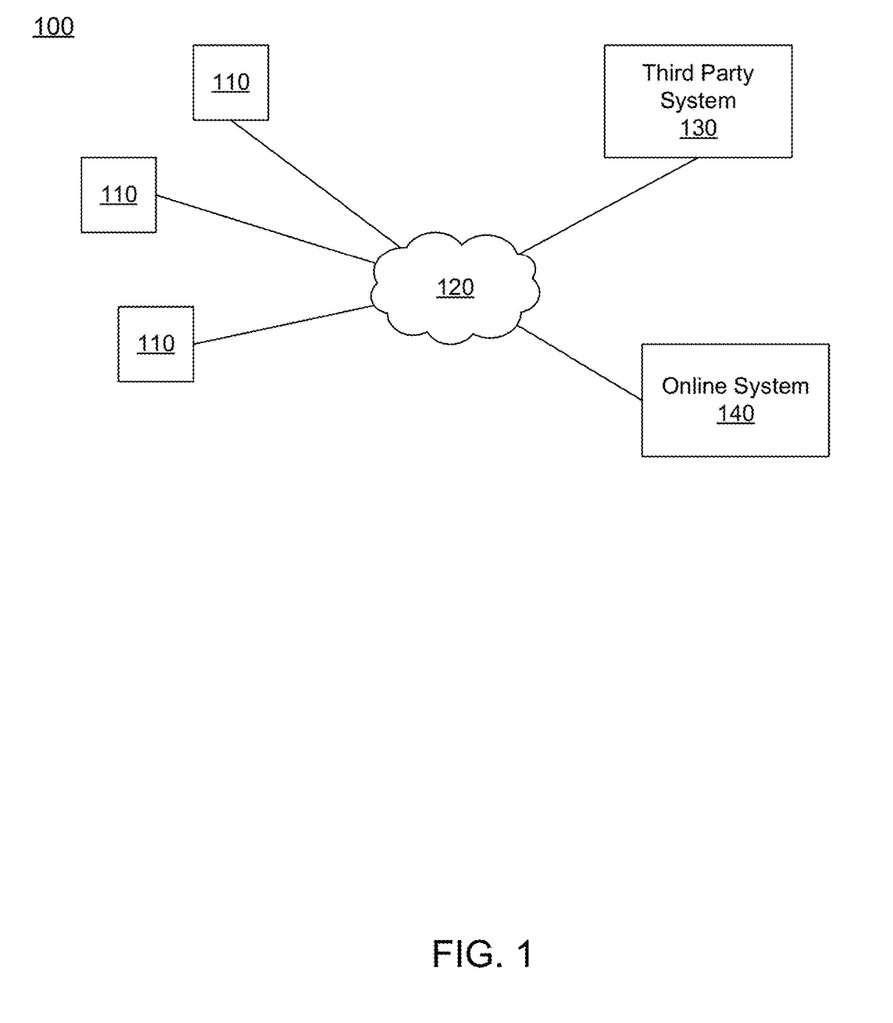
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to various online systems that publish ads, and may be included in various systems, such as a social networking system.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
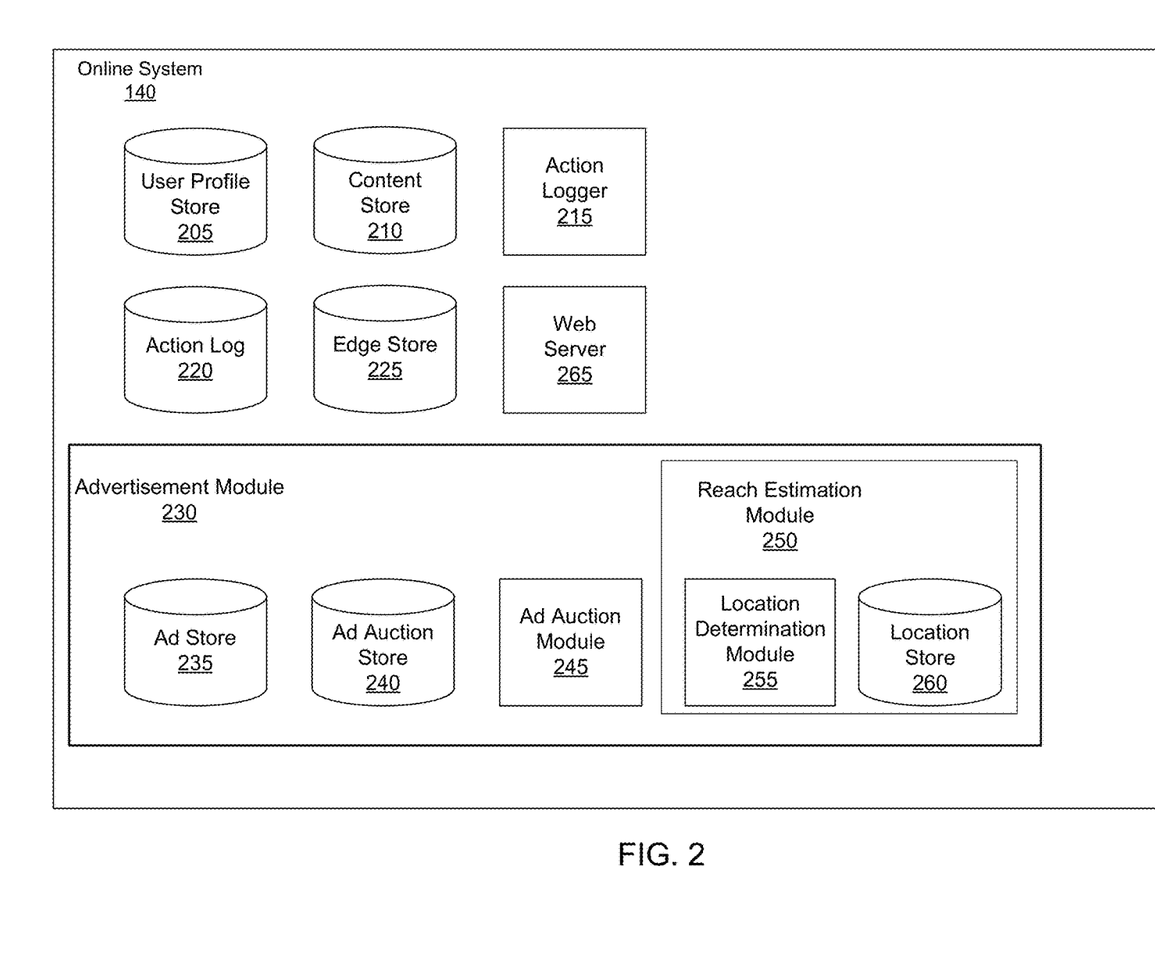
FIG. 2 is a block diagram of an online system, in accordance with an embodiment.

FIG. 2 is a block diagram of an architecture of the online system 140. The online system 140 shown in FIG. 2, includes a user profile store 205, a content store 210, an action logger 215, an action log 220, an edge store 225, an advertisement module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to online system users using a brand page associated with the entity's user profile. Other online system users may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by online system users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of online system users with each other and increases the frequency with which online system users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular online system users, so these actions are associated with those online system users as well and stored in the action log 220.

The action log 220 may be used by the online system 140 to track user actions on the online system 140, as well as actions on third party systems 130 that communicate information to the online system 140. Online system users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize an online system user through a social plug-in enabling the e-commerce website to identify the user of the online system 140. Because online system users are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other online system users 140, and commenting on posts made by other online system users.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The ad module 230 includes an advertisement store 235, an ad auction store 240, an ad auction module 245, and a reach estimation module 250. The ad module 230 stores information describing advertisement campaigns received from one or more advertisers. Each advertising campaign includes one or more advertisements described by ad requests included in the ad store 235. An advertisement request includes advertisement content, a bid amount, targeting criteria, and other ad parameters. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed.

Additionally, an advertisement request may include other ad parameters, including one or more targeting criteria specified by the advertiser. Targeting criteria included in an advertisement request specify one or more characteristics of users eligible to be presented with advertisement content in the advertisement request. For example, targeting criteria are used to identify online system users having user profile information, edges or actions satisfying at least one of the targeting criteria. Hence, targeting criteria allow an advertiser to identify users having specific characteristics, simplifying subsequent distribution of content to different users.

In one embodiment, targeting criteria specifies actions or types of connections between a user and another user or object of the online system 140. Targeting criteria may also specify interactions between a user and objects performed external to the online system 140, such as on a third party system 130. For example, targeting criteria identifies online system users that have taken a particular action, such as sending a message to another online system user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine online system users eligible to be presented with content from an advertisement request. As another example, targeting criteria identifies users having a connection to another user or object or having a particular type of connection to another user or object. In one embodiment, targeting criteria identifies online system users located in a specified a geographic region. For example, targeting criteria may specify a geographic region formed by a circle centered at an ad target location identified by or associated with an advertiser, and having a radius calculated by the online system to achieve a specified objective. Example ad target locations include a merchant location (e.g., a physical store), an area that may include customers or prospective customers of the advertiser, a point of interest, or other location of interest identified by or associated with the advertiser. In another example, the targeting criteria may specify a boundary of a geographic region that includes the merchant location of an advertiser.

Other parameters included in the ad request include one or more objectives, a duration, and a budget. An objective associated with an advertising campaign describes one or more goals for actions associated with the advertising campaign. For example, an objective specifies a desired total number of impressions of advertisements in the advertising campaign to online system users (an "impression objective"), specifies a desired total number of unique online system users to be presented with at least one advertisement from the advertising campaign (a "reach objective"), a desired number of times an advertisement from the advertising campaign is to be presented to an online system user (a "frequency objective"), or any other suitable criteria. The budget specifies a total amount of compensation an advertiser associated with an advertising campaign provides the online system 140 for presenting advertisements in the advertising campaign or for the online system 140 receiving interactions with advertisements in the advertising campaign. Additionally, the duration associated with the advertising campaign specifies a time interval during which advertisements from the advertising campaign are presented to online system users. For example, if the duration of an advertising campaign is 30 days, advertisements included in the advertising campaign are presented to online system users for 30 days after the advertising campaign is provided to the online system 140. In some embodiments, the advertiser may also specify a start date for the advertising campaign, so the duration is measured from the specified start date.

The ad auction store 240 includes information describing previously completed auctions where one or more advertisements were selected. For example, the ad auction store 240 includes information identifying a user for which a previously completed auction selected an advertisement, the advertisement selected from the previously completed auction, a bid amount associated with the selected advertisement, an amount charged to an advertiser associated with the selected advertisement, and a context scalar describing a context in which the selected advertisement was presented based on an advertisement auction (e.g., based on the user, based on a location of ad placement, based on a type of computing device used to view the ad, and the like). In various embodiments, additional information describing an ad auction may also be stored, such as targeting criteria associated with the selected advertisement.

The ad auction module 245 retrieves advertisements from one or more advertising campaigns and ranks the received advertisements based on their associated bid amounts when an opportunity to present an advertisement to a user is identified. For example, the ad auction module 245 ranks the received advertisements based on their associated expected values, which are based at least in part on the advertisements' bid amounts, where advertisements associated with larger expected values have a higher position in the ranking The ad auction module 245 selects one or more advertisements based on the ranking, and the selected advertisements are presented to an online system user. For example, the ad auction module 245 selects advertisements having the highest position in the ranking or having at least a threshold position in the ranking In other embodiments, the auction module 245 may use any other suitable method to select advertisements for presentation to an online system user.

The reach estimation module 250 estimates the number of distinct users that are in a certain geographical location within a given time period. The reach estimation module 250 includes a location determination module 255 and a location store 260. The location determination module 255 associates a location with a user of the online system 140 and a location with an ad target location identified by or associated with an advertiser. The location determination module 255 stores the association of the user and the ad target location in the location store 260. For each user associated with a location, the location determination module 255 stores a time stamp and location information. The time stamp indicates the date and/or time at which the location was obtained for the user. The location information includes a representation of the location associated with the user and the ad target location. For instance, the location determination module 255 may obtain the latitude and longitude of the location of the user using information provided by the user or determined based on location information accessible by the online system 140. Due to privacy reasons, the location determination module 255 only stores one location associated with each user in the location store 260. The location determination module 255 periodically updates the location associated with a user. In some embodiments, the location determination module 255 updates the location of a user within a specified amount of time.

To reduce the number of times the location associated with a user is updated, the location determination module 255 does not update the location associated with a user every time a new location is received. When a new location is received for a user, the location determination module 255 determines whether to update the location associated with the user. In some embodiments, the determination is based at least in part on the number of times a user location is received for the user in a specified amount of time (e.g., the number of times a user location is received for the user for a 7 day period of time). For instance, since each time a new location is received, the user location determination module 255 may determine whether to update the location of the user with a probability of 1/n, where n is the average number of times a location is received in a 7 day period. The average number of times a location is received may be determined based on historical data for the user. For example, the average number of times a location is received for the user may be determined based on the number of times a location was received for the user in past 30 days.

In one embodiment, the location determination module 255 associates information describing the ad target location with geographic coordinates, such as latitude, longitude, and elevation. Example information describing the ad target location includes text, such as a street address, and a graphical representation, such as a pin point on a map. In some implementations, the information describing the ad target location is received via a user interface for specifying an advertising campaign, as further described with reference to FIG. 4. In other implementations, the information describing the ad target location is obtained from a page on the online system 140 associated with the advertiser. For example, the online system 140 may crawl an advertiser's page on the online system 140 for a street address, merchant location store number, or other information from which information about the merchant location can be determined.

To optimize the local reach of an ad by users located near an ad target location, the location determination module 255 accesses location information about the ad target location, obtains the population density associated with the ad target location, and determines an estimated radius for a target area based on one or more ad campaign parameters, including ad reach. The target area encompasses online system users currently in the target area and online system users that were in target area during a specified time period.

In one embodiment, the location determination module 255 computes the estimated radius using a look-up table or other mapping of location information to population density for a particular geographic region. In one example, the location determination module 255 arranges population density information about various geographic regions into tiers or levels, each tier specifying a population density range (e.g., Tier A (0-100 k), Tier B (100 k-500 k), Tier C (500 k-1 m)). Population density tiers may have varying ranges based on information accessible by the online system 140. Because population densities associated with different geographic coordinates may vary, the location determination module 255 maps each population density tier to an estimated radius value. The estimated radius value defines a target area having an estimated ad reach of up to the range of population density defined by the corresponding population density tier. For example, for a densely populated area like Manhattan, N.Y., a first radius value is associated with a first population density tier corresponding to a highest level of population density. While, for a more sparsely populated area like Albany, N.Y., a second radius having larger value than the first radius is associated with a second population density tier corresponding to a lower level of population density. Thus, for a region with a lower population density, the location determination module 255 uses a larger radius estimation to achieve a specified ad reach compared to the estimated radius used for another region with a higher population density. Table 1 below shows an example mapping of population density tiers to estimated radius values. Table 1 includes six rows, corresponding to six population density tiers. For example, row 1 specifies a population density tier labeled "A" having a population density ranging from zero to one hundred thousand located in a target area with an estimated radius of ten miles measured from the center of the target area. Row 5 of Table 1 specifies a population density tier labeled "E" having a population density of greater than five million for a target area with an estimated radius of one mile measured from the center of the target area.

TABLE 1

| Population density | Radius |
|---|---|
| A (0-100k) | 10 mi/30 km |
| B (100k-500k) | 5 mi/10 km |
| C (500k-1m) | 3 mi/5 km |
| D (1m-5m) | 2 mi/3 km |
| E (>5m) | 1 mi/1 km |

Thus, rather than having the advertiser decide a radius for a target area, the location determination module 255 determines the estimated radius for a target area by holding ad reach constant, looking up a geographic location based on the street address, associating the geographic location with a population density tier, and using the mapping of population density to estimate radius. Other embodiments may include a greater number of tiers, a fewer number of tiers, or include tiers with narrower or broader ranges.

In one embodiment, the location determination module 255 generates an estimated target radius by analyzing historical information describing radius selection information and ad campaign performance information. Example radius selection information describes, for a given ad campaign, whether the online system 140 receives a selection of an initially determined estimated radius or a selection of an adjusted radius, as described further with reference to FIGS. 3 and 4. Example campaign performance information includes information describing the actual performance of the ad campaign, such as actual reach for a given ad spend, ad duration, and selected radius. In one implementation, the location determination module 255 uses one or more processors particularly configured to execute a local reach estimation algorithm. In one embodiment, the local reach algorithm receives historical radius selection information for previous ads published to online system users using the local reach ad create flow and actual ad performance information, and dynamically generates and estimated radius. In one embodiment, the online system 140 compares historical estimated ad reach information for a particular population density with actual ad reach and increases the stored estimated reach information for that particular population density if the actual ad reach under delivers and decreases the stored estimated reach information if the actual ad reach over delivers. In another embodiment, the local reach ad create flow dynamically calculates an estimated radius for a given ad reach goal and presents the calculated ad estimated radius as a selection in a user interface for local reach ad create flow, as described further with reference to FIGS. 3 and 4.

The web server 265 links the online system 140 via the network 120 to the one or more client devices 110, as well as to the one or more third party systems 130. The web server 265 serves web pages, as well as other content, such as JAVA®, FLASH®, XML and so forth. The web server 265 may receive and route messages between the online system 140 and the client device 110, for example, instant messages, queued messages (e.g., email), text messages, short message service (SMS) messages, or messages sent using any other suitable messaging technique. A user may send a request to the web server 265 to upload information (e.g., images or videos) that are stored in the content store 210. Additionally, the web server 265 may provide application programming interface (API) functionality to send data directly to native client device operating systems, such as IOS®, ANDROID™, WEBOS® or BlackberryOS.

Estimating a Dimension for Target Area

Figure 3:
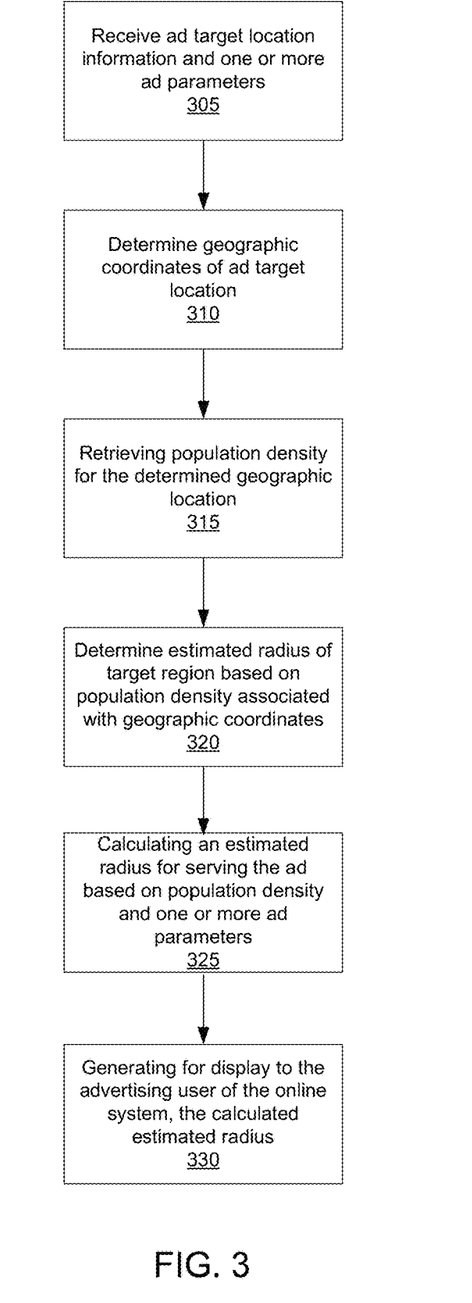
FIG. 3 is a flow chart illustrating a method of generating an estimated radius of a target area for publishing an advertisement in a target area, in accordance with an embodiment.

FIG. 3 illustrates a flow diagram of a process for estimating a radius defining a target area for publishing an ad to online system users inside the target area. For instance, the target area may be a circle centered at a reference point associated with a merchant location of an advertising user of the online system 140.

The reach estimation module 250 receives 305 information describing an ad target location identified by or associated with an advertising user of the online system 140 and one or more ad parameters for an ad. As previously described with reference to FIG. 2, example ad target location information includes street address, intersection, neighborhood, postal code, point of interest, store number, or other information from which a merchant location or target location may be determined. In one embodiment, the reach estimation module 250 receives information describing the ad target location from an advertising user via an user interface for an ad create flow. Example information describing the ad target location includes receiving an indication of placement of a drop pin or other indicator at a location on a map corresponding to the ad target location, as further described with reference to FIG. 4B. In another embodiment, an advertising user using the ad create flow selects a page associated with the merchant from which the reach estimation module 250 identifies merchant location information associated with the advertising user.

Using the ad target location information, the reach estimation module 250 determines 310 geographic coordinates of the ad target location. In one example, the location determination module performs a reverse geocoding to translate the ad target location information (e.g., a street address) into geographic coordinates, such as latitude and longitude parameters. In one implementation, the location determination module 255 queries a database or other data store for geographic coordinates for a particular merchant location. The database or data store may be internal to the online system 140 or external to the online system 140. In another implementation, at least some portion of the database is stored in location store 260.

The reach estimation module 250 uses the determined geographic coordinates and one or more of the received ad parameters to calculate 325 an estimated radius for serving the ad to online system users within a target area around the geographic coordinates of the ad target location. To optimize local awareness of an ad, the location determination module 255 uses the population density associated with the ad target location and ad parameters, such as ad reach, to select a radius defining a target area that will reach an audience of online system users located nearby to the ad target location. The location determination module 255 uses the determined geographic coordinates to determine 320 a population density range for an area associated with the geographic coordinates. In one implementation, a mapping of population density value to geographic coordinates is maintained in the location store 260. In another implementation, at least a portion of the information from which the location determination module 255 determines a mapping of geographic coordinates to population density is maintained external to the online system 140.

For each population density range, the reach estimation module 250 maintains a mapping of an estimated radius value, as previously described with reference to Table 1. Such a mapping may be based on data obtained from previous ad campaigns or accessed from sources external to the online system 140. In one embodiment, default estimated radius values may be updated at specified intervals or dynamically based on information gathered from ads served using the online system. For example, the reach estimation module 250 may identify a population density tier selected for previously served ads and the ads that used the selected population density tier. The reach estimation module 250 retrieves 315 estimated ad reach information and actual ad reach information for the identified ads, and compares the actual ad reach information with the estimated ad reach information for the identified ads. For each identified ad, the reach estimation module 250 determines a difference between the estimated ad reach and the actual ad reach, and calculates a cumulative difference between the estimated ad reach and the actual ad reach for all of the identified ads. If the cumulative difference meets a specified threshold, the reach estimation module 250 adjusts the estimated radius associated with that population density tier. For example, if the cumulative difference indicates that the actual ad reach for a population density tier is less than the estimated reach associated with the population density tier (i.e., the estimated reach over-delivers), the corresponding estimated radius is increased by a specified amount. In one implementation, the estimated radius is incrementally adjusted by a specified amount based on the magnitude of the cumulative difference. In other implementations, the estimated radius is incrementally adjusted by a specified amount, such as a percentage of the current estimated radius value.

The reach estimation module 250 uses the mapping of population density associated with the identified geographic area around the ad target location to select a corresponding estimated radius value for serving the ad to online system users within a target area around the geographic coordinates of the ad target location. In one embodiment, the reach estimation module 255 employs an estimated radius prediction module that uses information about prior estimated radius selection information for ads and actual performance information for published ads to predict an estimated radius for a candidate ad to be published using the local reach ad create flow. The online system 140 provides a training set of data to the reach estimation module 250 that includes example ad parameters, estimated reach selection information, actual ad performance, and a desired ad reach. The training set of data is applied to an estimated radius learning algorithm to learn a general rule that maps inputs to outputs. The online system 140 may train the estimated radius model at a specified interval. As additional ads are served using the local reach ad create flow, the online system 140 may update or otherwise modify the training data set, which in turn may be applied to the estimated radius learning algorithm to update or modify the general rule that maps inputs to a predicted estimated radius value.

In one embodiment, the reach estimation module 250 generates 330 an estimated perimeter or boundary defining a target area. An estimated boundary specifies one or a combination of a street, roadway, or other geographic feature that defines the perimeter of the target area. The reach estimation module 250 may employ one or combination the mapping-based or machine learning-based methods to predict an estimated perimeter defining a target area. For example, for each population density range, the reach estimation module 250 maintains a mapping of a plurality of geographic coordinates defining an estimated boundary of a target area. In one implementation, the geographic coordinates may define a set of boundaries, each boundary defining a target area around the merchant area having an estimated reach value associated with a corresponding population density tier. Thus, for a given population density tier, the mapping associates one or more estimated boundaries defining a target area. In one embodiment, the reach estimation module 250 employs an estimated boundary prediction module that uses information about prior estimated boundary selection information for ads, and actual performance information for published ads to predict an estimated boundary for a candidate ad to be published using the local reach ad create flow. Example boundary selection information includes whether the online system received an indication that a pre-filled boundary was selected or an adjusted boundary was selected. An indication of a selection of an adjusted boundary includes an adjustment (e.g., grabbing and moving a point or a portion of a line on a map defining the boundary) made to a geographic representation of the boundary included on a map, or text specifying a modification to a prefilled textual description of a boundary. Such a model may be employed in a manner similar to the model for predicting an estimated radius, as previously described.

In some embodiments, the reach estimation module 250 determines an estimated reach for multiple target locations within a target area. For example, the reach estimation module 250 computes a cumulative estimated ad reach for publishing the ad to online system users in a target area associated with multiple merchant locations by applying a scaling factor based on a ratio of the measures of the population densities associated with the respective merchant locations.

Figure 4A:
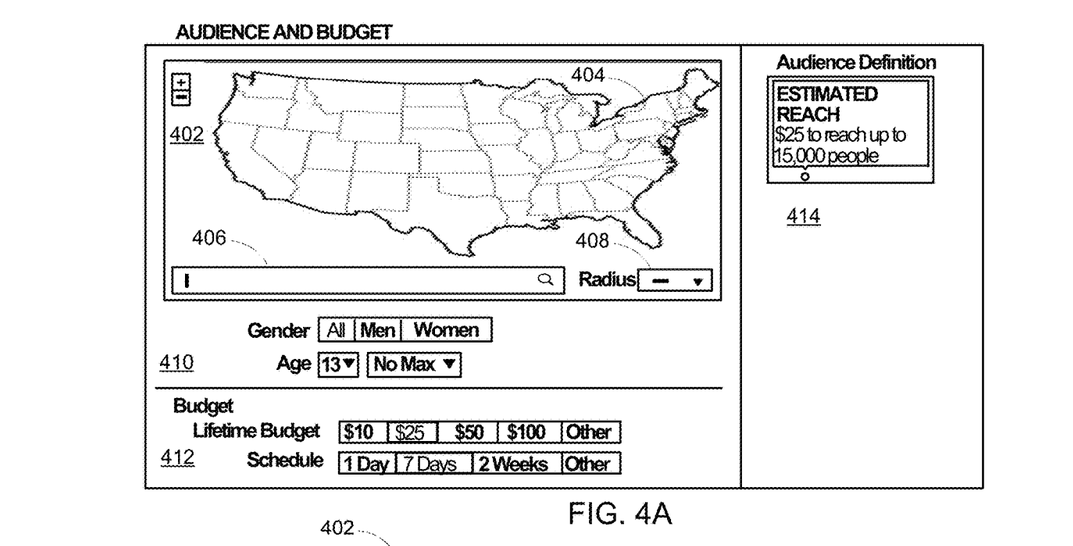
FIG. 4A is a first view of a user interface of a local ad reach create flow for generating an estimated radius of a target area for publishing an advertisement in a target area, in accordance with an embodiment.

FIG. 4A is a user interface 400 of a local reach ad create flow for generating an estimated radius of a target area for publishing an advertisement in a target area. The user interface 400 for the local reach ad create flow provides a simple interface for quickly setting up an ad for publishing to online system users located nearby to a merchant location. Unlike other ad publishing systems, the user interface 400 to the local reach ad create flow prefills an estimated radius or estimated boundary defining a target area for serving an ad based on a selected merchant location address and ad parameters, like ad spend. Along with the prefilled estimated radius, online system 140 calculates an estimated reach for the ad and displays the estimated reach to the advertising user via the user interface 400.

Figure 4B:
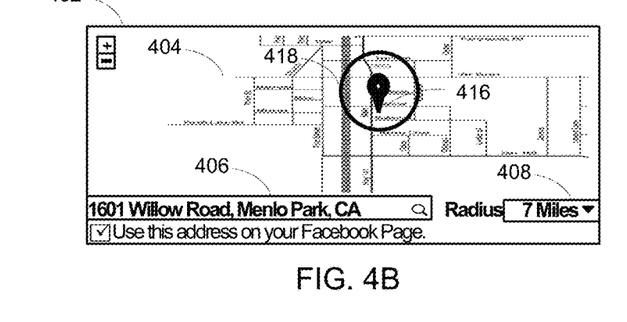
FIG. 4B is a second view of a user interface of a local ad reach ad create flow for generating an estimated radius of a target area for publishing an advertisement in a target area, in accordance with an embodiment The figures depict various embodiments of the present invention for purposes of illustration only. One skilled in the art will readily recognize from the following discussion that alternative embodiments of the structures and methods illustrated herein may be employed without departing from the principles of the invention described herein.

In one embodiment, the online system 140 provides an ad create flow user interface 400 that allows an advertiser to specify one or more ad parameters and pre-fills an estimated radius or target area boundary around an at target location for serving the ad based on the specified ad parameters. The user interface 400 includes a location selection portion 402 for receiving location information for a merchant location associated with an advertising user of the online system 140. The location selection portion 402 includes a map portion 404, a location selection field 406, and a radius selection field 408. The map portion 404 displays merchant location on a map. The merchant location may be displayed using a symbol, such as a pinpoint, text, other graphical indicator. The location selection field 406 receives location information about an ad target location, such as a street address, intersection, other information identifying a merchant location or other ad target location as previously described with reference to FIG. 2. In one implementation, the location selection field 406 displays an option for selecting a page for the merchant location on the online system 140. Responsive to receiving a page selection, the online system 140 determines whether the page includes an address for the merchant location. If an address is not identified, the online system 140 may display a prompt requesting location information about the ad target location, which may be input into location selection field 406 as textual description. On the other hand, if an address is identified, the identified address may be displayed in the input field 406 for confirmation and/or selection. For example, as shown in FIG. 4B, responsive to receiving the merchant location information, the online system 140 displays, in the radius selection field 408, an estimated radius defining a target area around the merchant location for serving the ad. The target area 418 is displayed on the map portion 404 along with an indicator 416 representing the merchant location. The radius selection field 408 may receive a modified estimated radius selection amount as described with reference to FIG. 3, which is used by the online system 140 to recalculate an estimated ad reach for the candidate ad. The recalculated estimated reach, estimate radius, and one or more ad parameters are displayed in the ad results portion 414, as shown in FIG. 4A. The ad results portion 414 may also include additional information including a range or scale representing an ad reach range for a given ad spend, estimated radius, or other ad parameters, and one or more hints or suggestions for serving the ad based on the selections received via the user interface 400.

Returning to FIG. 4A, the target criteria selection portion 410 includes one or more fields for specifying targeting criteria for the ad, such as gender and age of the target audience for receiving the published ad. The ad budget selection portion 412 includes one or more fields for specifying ad budget related information, such as life time budget and ad duration. Thus, using the local reach ad create flow user interface 400 allows an advertiser to adjust the parameters for ad campaign to reach a target audience located nearby to an ad target location associated with or identified by the advertising user at the lowest cost. The user interface 400 also allows an advertiser to simply specify a merchant address and an ad spend, and generate an estimated radius for serving the ad to optimize local reach. Using the estimated reach, the advertising user may finalize the ad by selecting an image, creating a message, and selecting publish. The target area for publishing the ad encompasses online system users currently located in the space or that were located in the area for some specified period of time. Once served, the ad would be available to all of those individuals.

CONCLUSION

The foregoing description of the embodiments has been presented for the purpose of illustration; it is not intended to be exhaustive or limited to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus.

Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the embodiments be limited not by this detailed description, but rather by any claims that issue on an application based hereon. Accordingly, the disclosure of the embodiments is intended to be illustrative, but not limiting in scope, which is set forth in the following claims.

What is claimed is:

1. A method comprising:
   receiving information at an online system including one or more processors describing an ad target location identified by an advertising user of the online system and one or more ad parameters for an ad from a user interface generated by the online system and displayed by a client device;
   determining geographic coordinates of the ad target location based at least in part on the received ad target location information;
   retrieving population density information maintained by the online system for the determined geographic coordinates;
   based at least in part on the retrieved population density and one or more ad parameters, selecting, by the online system, an estimated radius for serving the ad to online system users within a target area around the geographic coordinates of the ad target location;
   generating, for display to the advertising user of the online system via the user interface displayed by the client device, a map portion displaying an indicator corresponding to the ad target location and displaying the target area including locations within the selected estimated radius around the geographic coordinates of the ad target location;
   receiving, via a radius selection field displayed in the user interface displayed by a client device, a selection of a modified estimated radius from the client device;
   computing, by the online system, an updated estimated ad reach for serving the ad based at least in part on the modified estimated radius;
   displaying the updated estimated ad reach and the modified estimated radius via the map portion of the user interface displayed by the client device;
   receiving, via the user interface displayed by the client device, information describing an additional ad target location associated with the advertising user;
   determining, by the online system, geographic coordinates of the additional ad target location based at least in part on the additional ad target location information;
   retrieving a measure of population density associated with the determined geographic coordinates of the additional ad target location from information stored by the online system;
   retrieving information associating the retrieved measure of population density with information specifying a dimension of an additional target geographic region for serving the ad from information stored by the online system, the dimension of the additional target geographic region defined relative to the determined geographic coordinates of the additional ad target location; and
   computing, by the online system, a cumulative estimated ad reach for publishing the ad based at least in part on a dimension of the ad target location, the dimension of the additional target geographic region, the one or more ad parameters, and a scaling factor based on a ratio of the measures of the population densities associated with the ad target location and the additional ad target location, respectively.

2. The method of claim 1, wherein the information describing the ad target location is received from the advertiser.

3. The method of claim 1, wherein the information describing the ad target location is retrieved from a page on the online system associated with the advertising user.

4. The method of claim 1, wherein the determined geographic coordinates are represented as a latitude and longitude pair.

5. The method of claim 1, wherein the ad parameters include at least one of ad budget, ad frequency, and ad duration.

6. The method of claim 1, further comprising:
   receiving via the user interface displayed by the client device an indication of a selection of the estimated radius; and
   serving the ad to one or more online system users within the target area.

7. The method of claim 1, wherein calculating an estimated radius for serving the ad to online system user within a target area around the geographic coordinates of the ad target location comprises:
   identifying a plurality of ads served to online system users within the target area;
   obtaining information about prior estimated radius selection information for the identified plurality of ads, and actual performance information for the identified ads;
   applying the obtained information to a estimated radius prediction model; and
   dynamically calculating a predicted estimated radius for serving the ad with the target area using the estimated radius prediction model.

8. The method of claim 7, wherein dynamically calculating a predicted estimated radius comprises:
   identifying a population density tier selected for previously served ads;
   identifying ads that used the selected population density tier;
   retrieving estimated ad reach information and actual ad reach information for the identified ads;
   comparing the actual ad reach information with the estimated ad reach information for the identified ads;
   for each identified ad, determining a difference between the estimated ad reach and the actual ad reach;
   calculating a cumulative difference between the estimated ad reach and the actual ad reach for all of the identified ads; and
   adjusting a stored estimated reach information for the identified population density when the cumulative difference meets an adjustment threshold.

9. A method comprising:
   logging ad information at an online system including one or more processors describing radius selection information, one or more ad parameters, and actual ad reach information for a plurality of published ads;

retrieving an estimated radius prediction model stored by the online system for predicting an estimated radius for serving an ad, the estimated radius prediction model using the logged information to predict an estimated radius for serving the ad in a target area;

receiving information describing an ad target location of an advertising user of the online system and one or more ad parameters for a candidate ad at the online system from a user interface generated by the online system and displayed by a client device;

determining geographic coordinates of the ad target location based at least in part on the ad target location information;

retrieving population density information maintained by the online system for the determined geographic coordinates;

applying, by the online system, the retrieved population density information and one or more ad parameter to the estimated radius prediction model;

predicting an estimated radius for serving the candidate ad to online system users within an area around the geographic coordinates of the ad target location;

generating by the online system, for display to the advertising user of the online system via the user interface displayed by the client device, a map portion displaying an indicator corresponding to the ad target location and displaying the target area including locations within the predicted estimated radius around the geographic coordinates of the ad target location;

receiving via a radius selection field displayed in the user interface displayed by the client device, a selection of a modified predicted estimated radius;

computing, by the online system, an updated estimated ad reach for serving the candidate ad based at least in part on the modified predicted estimated radius;

displaying the updated estimated ad reach and the modified estimated radius via the map portion of the user interface of the online system displayed by the client device;

receiving, via the user interface displayed by the client device information describing an additional ad target location associated with the advertising user;

determining, by the online system, geographic coordinates of the additional ad target location based at least in part on the additional ad target location information;

retrieving a measure of population density associated with the determined geographic coordinates of the additional ad target location from information stored by the online system;

retrieving information associating the retrieved measure of population density with information specifying a dimension of an additional target geographic region for serving the ad from information stored by the online system, the dimension of the additional target geographic region defined relative to the determined geographic coordinates of the additional ad target location; and computing, by the online system, a cumulative estimated ad reach for publishing the ad based at least in part on a dimension of the ad target location, the dimension of the additional target geographic region, the one or more ad parameters, and a scaling factor based on a ratio of the measures of the population densities associated with the ad target location and the additional ad target location, respectively.

10. The method of claim 9, wherein the information describing the ad target location is received from the advertiser.

11. The method of claim 9, wherein the information describing the ad target location is retrieved from a page on the online system associated with the advertising user.

12. The method of claim 9, wherein the determined geographic coordinates are represented as a latitude and longitude pair.

13. The method of claim 9, wherein the one or more ad parameters include at least one of ad reach, ad budget, ad frequency, and ad duration.

14. The method of claim 9, further comprising:
receiving via the user interface displayed by the client device an indication of a selection of the predicted estimated radius; and
serving the ad to one or more online system users within an area around the ad target location.

15. A method comprising:
receiving information at an online system including one or more processors describing a merchant location identified by an advertising user of an online system and one or more ad parameters for an ad from a user interface generated by the online system and displayed by a client device, the one or more ad parameters including ad target location information;

determining geographic coordinates of the ad target location based at least in part on the ad target location information;

retrieving population density information maintained by the online system for the determined geographic coordinates;

based at least in part on the retrieved population density and one or more ad parameters, selecting an estimated boundary for serving the ad to online system users within a target area around the geographic coordinates of the ad target location, the estimated boundary defining a perimeter of the target area; and generating for display to the advertising user of the online system the user interface displayed by the client device, a map portion displaying an indicator corresponding to the ad target location and displaying the target area including locations within the selected estimated boundary from the ad target location;

receiving via a radius selection field displayed in the user interface displayed by the client device, a selection of a modified estimated boundary;

computing, by the online system, an estimated ad reach for serving the ad based at least in part on the modified estimated boundary;

displaying the updated estimated ad reach and the modified estimated radius via the map portion of the user interface displayed by the client device;

receiving, via the user interface displayed by the client device, information describing an additional ad target location associated with the advertising user;

determining, by the online system, geographic coordinates of the additional ad target location based at least in part on the additional ad target location information;

retrieving a measure of population density associated with the determined geographic coordinates of the additional ad target location from information stored by the online system;

retrieving information associating the retrieved measure of population density with information specifying a dimension of an additional target geographic region for serving the ad from information stored by the online system, the dimension of the additional target geographic region defined relative to the determined geographic coordinates of the additional ad target location; and computing, by the online system, a cumulative estimated ad reach for publishing the ad based at least in part on a dimension of the ad target location, the dimension of the additional target geographic region, the one or more ad parameters, and a scaling factor based on a ratio of the measures of the population densities associated with the ad target location and the additional ad target location, respectively.

16. The method of claim 15, wherein the estimated boundary is represented graphically.

17. The method of claim 15, wherein a plurality of estimated boundaries is associated with the retrieved population density.

* * * * *

UNITED STATES PATENT AND TRADEMARK OFFICE
CERTIFICATE OF CORRECTION

PATENT NO.         : 10,460,343 B2
APPLICATION NO.    : 14/526365
DATED              : October 29, 2019
INVENTOR(S)        : Erick Tseng

Page 1 of 1

It is certified that error appears in the above-identified patent and that said Letters Patent is hereby corrected as shown below:

In the Claims

Column 16, Line 42, Claim 7, delete "a estimated" and insert -- an estimated --.

Signed and Sealed this
Seventeenth Day of November, 2020

Andrei Iancu
*Director of the United States Patent and Trademark Office*